Jan. 5, 1965  F. EHRSAM  3,164,124
SIGNAL MIRROR
Filed July 2, 1963
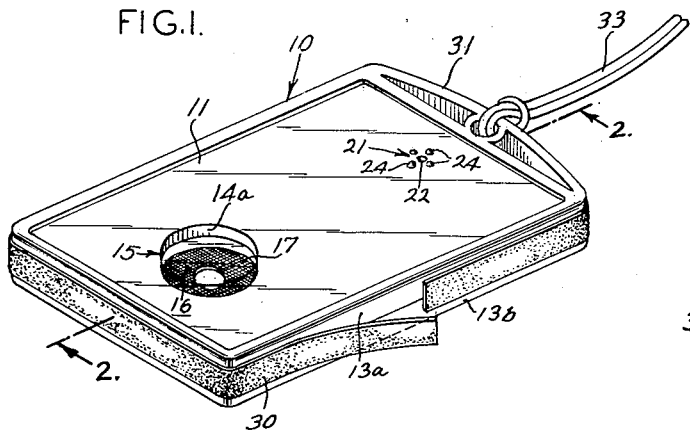
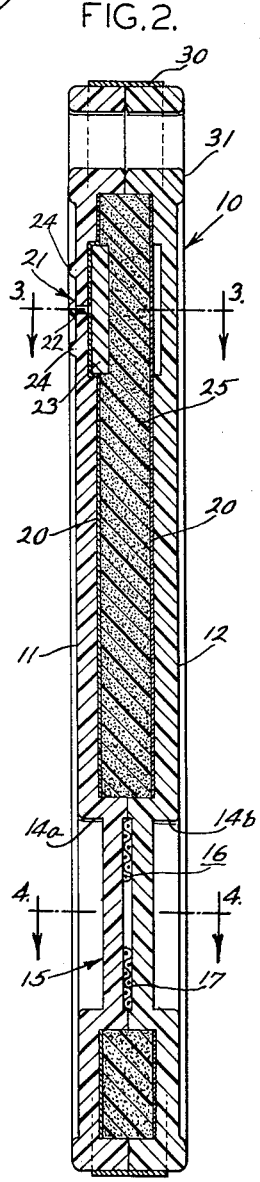
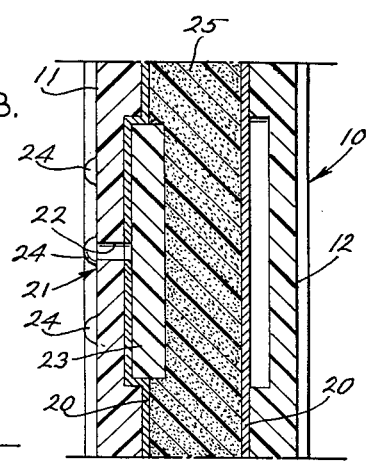
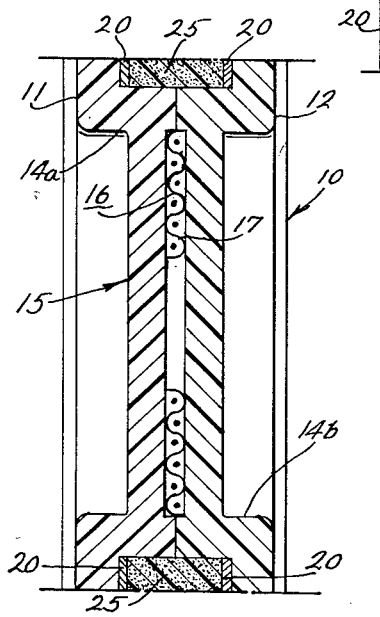
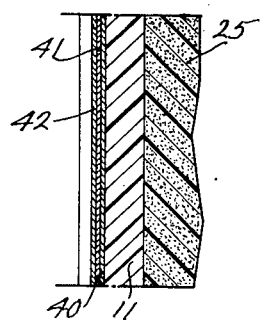
INVENTOR:
FREDERICK EHRSAM
BY Howson & Howson
ATTYS.

United States Patent Office 3,164,124
Patented Jan. 5, 1965

3,164,124
SIGNAL MIRROR
Frederick Ehrsam, Rte. 662, Oley, Pa.
Filed July 2, 1963, Ser. No. 292,244
8 Claims. (Cl. 116—20)

The present invention relates to emergency signaling devices for sending distress signals by reflecting light to desired targets such as searching aircraft or the like. More particularly, the present invention relates to a signaling mirror which may be floated and is relatively waterproof and at the same time is impervious to changes in atmospheric pressure due to changes in altitude.

Signal mirrors are used principally by persons in distress for attracting the attention of potential rescuers. Because of the conditions under which they are generally used, it is necessary that signal mirrors be small, compact, and light in weight as well as simplified in construction. However, the function of a signal mirror as utilized in the past has been unitary. That is, a signal mirror has been generally thought of as being useful for signaling only after a potential rescuer has been spotted. The reason for this is a signal mirror is conventionally utilized by persons in distress on such a craft as a life raft which pitches and rolls constantly in almost any kind of sea state. For a person in distress to hold a signal mirror in a position which would enable him to cover the horizon with a sweeping series of flashes and at the same time maintain his balance on such a precarious platform is extremely difficult if not impossible. It would be difficult to estimate the number of persons who have missed rescue either through inability to signal a rescue plane due to weakness caused by prolonged exposure to the elements, or due to the fact that the rescue plane was overlooked entirely.

Another problem which exists in the signal mirrors presently being used by ships of the fleet and aircraft which carry lifesaving equipment, is the difficulty for any sealed object, which is intended to be watertight, resisting changes in atmospheric pressure. Prior attempts at constructing a watertight signal mirror for use in lifesaving equipment which would be carried in an aircraft, has resulted in many instances in the casings imploding or exploding due to the difference between the inside pressure on the container, wherein some air has been entrapped, and the outside atmospheric pressure, which at high altitudes can be significantly different.

In light of the foregoing, a primary purpose of the present invention is to provide a signal mirror which has a dual function, that is to provide a signal mirror which may be hand operated by a person in distress and which may be utilized to reflect light constantly, when light is available, and to act as a signal source in all directions without a person in distress having to hold the same in order to signal.

In accordance with the foregoing it is a primary object of the present invention to provide a watertight, floatable signal mirror which may be trailed after a life raft or small craft so as to be placed in constant motion by wave action thereby affording a constant source of light flashes or varying signals which sweep from horizon to horizon.

Another object of the present invention is to provide a waterproof, watertight floatable signal mirror which is impervious to changes in atmospheric pressure due to changes in altitude.

Another object of the present invention is to provide a signal mirror which is relatively nonbreakable, nonsinkable, and yet of relatively light weight.

Other objects and a fuller understanding of the invention may be had by referring to the following description and claims taken in conjunction with the accompanying drawings in which:

FIG. 1 is a perspective view of a signal mirror constructed in accordance with the present invention;

FIG. 2 is an enlarged sectional view taken along line 2—2 of FIG. 1;

FIG. 3 is an enlarged fragmentary sectional view of a portion of the signal mirror shown in FIG. 1 and as viewed in the direction and from the position of line 3—3 of FIG. 2;

FIG. 4 is an enlarged fragmentary sectional view of a portion of the signal mirror shown in FIG. 1 and as viewed in the direction and from the position of line 4—4 of FIG. 2; and FIG. 5 is an enlarged fragmentary sectional view of another embodiment of a signal mirror constructed in accordance with the present invention.

Referring now to the drawing, especially FIGS. 1 and 2, the signal mirror illustrated therein and constructed in accordance with the present invention comprises generally a watertight hollow shell 10 having substantially transparent portions, and outwardly directed light reflecting means 20 mounted on the transparent portions of the shell 10 and adapted to reflect light impinging upon the reflecting means 20.

In the present instance the watertight hollow shell 10 comprises an upper portion 11 and a lower portion 12 having outer marginal flanges 13a and 13b respectively which are adapted for mating in abutting relationship so as to enable sealing of the hollow interior. Both the upper and lower portions 11 and 12 have substantially smooth planar surfaces save for axially concentric offset portions 14a and 14b provided in the upper and lower portions 11 and 12 respectively, defining a sighting window 15 somewhat similar in construction to the windows illustrated in the Hunter Patent No. 2,557,108 and the Morgan Patent No. 2,698,594.

Referring now to FIG. 2, in the present instance the reflecting means 20 constitutes a very thin, silver or aluminum plated polystyrene sheet. However, other means of providing a reflecting surface have been successfully used. For example, the inside of the upper and lower portions 11 and 12 may be vacuum metalized to produce a highly efficient reflector integral with those portions. However, this method of forming a reflecting surface is expensive and the separate element has been found very satisfactory.

The space between the nonreflective surfaces of the reflecting means 20 is filled with an air permeable porous means 25, in the present instance a plastic foam. The air permeable porous means 25 is of light weight, while being air permeable omnidirectionally, and is of sufficient porosity to allow the maintenance of air within, thereby causing the whole mirror to float when immersed in water. Further, the plastic foam has been chosen with a sufficient strength in compression to enable the reflecting means 20, when it is not bonded to the inner surface, to be pressed against the inner portion of the watertight hollow shell.

In certain instances where specifications are very stringent, as for example with Navy specifications which require the entire mirror to be relatively nonbreakable, an extremely durable and tough plastic which is break resistant must be used. Usually plastics which meet these specifications are not as transparent as those less durable, and therefore oftentimes it is desirable to place the reflecting means on the outer surface of the plastic. One such plastic that has been found to be extremely durable is Lexan which belongs to the class of thermoplastic polycarbonate resins. As is illustrated in the embodiment shown in FIG. 5, where the reflecting means 20 is placed on the outer surface of the upper and/or lower portions 11 and 12, the outside of the shell is first sprayed with a filling lacquer 40, the metalizing layer 41 applied on top of it, and the latter is then covered with a protective lacquer 42. For the purposes of illustration, the thicknesses of the coatings have been exaggerated.

In order that the mirror of the present invention may be utilized in aircraft and the like as standard lifesaving equipment, and in accordance with another feature of the invention, vent means 21 is provided so as to cause the atmosphere to be able to communicate with the air permeable porous means 25 thereby preventing explosion at reduced atmospheric pressures. To this end, and as best illustrated in FIG. 3, an aperture 22, of very small internal diameter on the order of .010 of an inch, is formed in the upper portion 11 of the hollow shell 10, and through the reflecting means 20. In order to insure that water does not inadvertently seep through the aperture 22 and fill the air permeable porous means 25 thereby causing the mirror to sink when immersed in water, a water-resistive, air permeable means 23 covers the aperture 22 on the inside. In the present instance the water-resistive air permeable means 23 is constructed of Teflon felt, which has been found to be of sufficient porosity to allow air flow therethrough but of sufficient density to prevent water from seeping through to the air permeable porous means 25.

One other feature of the invention is that when the mirror is carried in lifesaving equipment, as part of the normal gear pertaining thereto, the mirror would normally be carried inside a protective envelope, similar to a pocket. To prevent sealing of the vent hole, which could result in the mirror exploding when changing from reduced atmospheric pressure to elevated or normal atmospheric pressures, protrusions 24, in the present instance part of the upper portion 11 of the shell 10, surround the vent aperture 22 thereby preventing the protective envelope from inadvertently sealing the vent means 21.

In order when a rescue plane or ship is sighted the signal mirror may be hand held and used to accurately reflect so as to engage the attention of the would-be rescuers, a sighting window 15 is provided in the lower portion of the mirror. As previously described the axially concentric offset portions 14a and 14b in the upper portion 11 and lower portion 12 respectively of the watertight hollow shell 10, confront one another and define the sighting window 15. In the present instance the sighting window comprises a retroreflective element 16 which is in the form of a wire mesh screen disk 17, upon the strands of which are supported glass type beads having high angularity, retroreflective surfaces. As may be noted in FIG. 4, the central portion of the wire mesh screen disk 17 has been removed thereby defining a sighting aperture which provides a means for aiming the reflection at the rescue target.

As is best illustrated in FIG. 1, the outer marginal flanges 13a and 13b are covered by a waterproof tape 30 which seals and conceals the seam between the upper and lower portions of the hollow shell. Also, centrally located at one end of the mirror is an extension 31 having an aperture for the reception of a lanyard 33 which permits one or more of the signaling devices to be fastened to the raft or around the neck of a person in distress, as desired.

Thus the present invention provides a watertight, floatable signal mirror which may be trailed after a life raft or small craft so as to be placed in constant motion by wave action thereby affording a constant source of light flashes or varying signals which sweep from horizon to horizon and permit faster recovery of a person in distress on the water. Further, the present invention provides a waterproof floatable signal mirror which is impervious to changes in atmospheric pressure due to changes in altitude, thus making the present invention susceptible of use either on ships at sea, in aircraft or on land.

This application is a continuation-in-part of the copending application filed January 30, 1962, S.N. 169,845, now abandoned.

Although the invention has been described with a certain degree of particularity, it is understood that the present disclosure has been made only by way of example and that numerous changes in the details of construction and the combination and arrangement of parts may be made without departing from the spirit and the scope of the invention, as hereinafter claimed.

What is claimed is:

1. A signal mirror comprising a substantially planar upper and lower portion spaced from one another but having portions in mating relationship to form a waterproof hollow outer shell, sheet-like elements having an outwardly directed mirrored surface, each of said planar portions supporting one of said elements and substantially coexistensive therewith, said shell being of lighter weight than an equal volume of water whereby it floats, said shell having external dimensions such that when said mirror is floating at least one of said mirrored surfaces is positioned upwardly to reflect light impinging thereupon, coextensive offset portions recessed in said upper and lower portions respectively, confronting one another and defining a sighting window, said sighting window comprising a retroreflective element interposed and held in place between said confronting offset portions, said retroreflective element conforming in configuration to said offset portion, a sighting aperture in said retroreflective element adapted to enable sighting of a target to which it is desired to reflect light from said reflecting means.

2. A signal mirror comprising a watertight hollow shell having substantially transparent portions, air permeable porous means inside said hollow shell, light reflecting means supported in the transparent portion of said shell and interposed between said hollow shell and said porous means with its light reflective surface facing outwardly, said signal mirror being of lighter weight than an equal volume of water whereby it floats.

3. A floatable signal mirror in accordance with claim 2 including vent means in communication with said air permeable porous means adapted to enable air passage into and out of said watertight hollow shell.

4. A floatable signal mirror in accordance with claim 3 wherein said vent means includes a water resistive, separate air permeable means covering said vent means and adapted to enable passage of air through said vent means but to prevent passage of water therethrough.

5. A floatable signal mirror in accordance with claim 4 including protrusions on the outer surface of said shell spaced about said vent means so as to prevent inadvertent sealing of said vent means.

6. A signal mirror comprising a waterproof hollow outer shell having substantially planar upper and lower portions, air permeable porous means inside said hollow shell, outwardly directed light reflecting means supported in the transparent portions of said shell between said upper and lower portions, said signal mirror being of lighter weight than an equal volume of water whereby it floats.

7. A floatable signal mirror comprising a pair of substantially planar transparent portions, each of said portions having an outer marginal flange mating with the flange of the other portion so that a watertight hollow shell is formed, air permeable porous means inside said shell, outwardly directed light reflecting means supported in said shell between said hollow shell and said porous means, coextensive offset portions recessed in said upper and lower portions respectively, confronting one another and defining a sighting window, said sighting window comprising a retroreflective element interposed and held in place between said confronting offset portions, said retroreflective element conforming in configuration to said offset portion, a sighting aperture in said retroreflective element adapted to enable sighting of a target to which it is desired to reflect light from said reflecting means.

8. A floatable signal mirror in accordance with claim 7 having a vent means passing through one of said planar portions and in communication with said air conductive porous means so as to render said watertight hollow shell impervious to atmospheric pressure differentials.

References Cited by the Examiner

UNITED STATES PATENTS

| | | | |
|---|---|---|---|
| 2,557,108 | 6/51 | Hunter | 116—20 |
| 2,698,594 | 1/55 | Morgan | 116—20 |

FOREIGN PATENTS 595,044  3/60  Canada.

LOUIS J. CAPOZI, *Primary Examiner.*